(12) United States Patent
Gaertner et al.

(10) Patent No.: US 6,339,811 B1
(45) Date of Patent: Jan. 15, 2002

(54) ROTATIONALLY OPTIMIZED SEEK INITIATION

(75) Inventors: Mark A. Gaertner, Woodbury, MN (US); Joseph L. Wach, Longmont, CO (US)

(73) Assignee: Seagate Technologh LLC, Scotts Valley, CA (US)

(*) Notice: Subject to any disclaimer, the term of this patent is extended or adjusted under 35 U.S.C. 154(b) by 0 days.

(21) Appl. No.: 09/473,481

(22) Filed: Dec. 28, 1999

Related U.S. Application Data (60) Provisional application No. 60/130,285, filed on Apr. 21, 1999, and provisional application No. 60/158,833, filed on Oct. 12, 1999.

(51) Int. Cl.$^7$ .............................................. G06F 12/08
(52) U.S. Cl. ...................................... 711/112; 711/137
(58) Field of Search ........................... 360/78.14, 78.04; 369/43; 711/111, 112, 113, 137, 117, 213

(56) References Cited

U.S. PATENT DOCUMENTS

| | | | |
|---|---|---|---|
| 4,489,378 A | 12/1984 | Dixon et al. .................. 710/33 |
| 5,133,060 A | 7/1992 | Weber et al. ................. 711/113 |
| 5,146,578 A | 9/1992 | Zangenehpour .............. 711/137 |
| 5,268,804 A | * 12/1993 | Wallis ...................... 360/78.04 |
| 5,483,641 A | 1/1996 | Jones et al. ..................... 710/3 |
| 5,687,389 A | * 11/1997 | Packer .......................... 710/5 |
| 5,729,718 A | * 3/1998 | Au .............................. 711/167 |
| 5,765,189 A | * 6/1998 | Treiber et al. .............. 711/117 |
| 5,796,546 A | * 8/1998 | Saamoto et al. ......... 360/78.04 |
| 5,995,318 A | * 11/1999 | Hasegawa et al. ....... 360/78.14 |
| 6,085,287 A | * 7/2000 | O'Neil et al. ............... 711/113 |

* cited by examiner

Primary Examiner—Do Hyun Yoo
Assistant Examiner—Gary J. Portka
(74) Attorney, Agent, or Firm—Merchant & Gould; Jeramie Keys (57) ABSTRACT

Methods and control systems for delaying a seek once a command is received to further load a buffer with read look ahead data are described. The methods involve calculating when or at what point the prefetching should cease and a seek should be initiated so that the actuator arm arrives at a new track just in time to begin reading the target data. The control systems include a processor that instructs a servo control to hold the actuator on a track while data is prefetched and loaded into a buffer until a seek must be initiated to allow the actuator to arrive at the new track just in time to begin reading the new target data.

18 Claims, 6 Drawing Sheets

Fig. 8 too long rotates to the actuator arm and is read by the head. At that point, the actuator arm seeks to the new track just in time to begin reading the new target data.

These two methods may also be adapted to disc drives where several commands are qeued and scheduled to minimize the seek times. In such a case, either the latency period or the trigger burst between reading each command is calculated for all the commands.

In another aspect of the invention, the apparatus includes a processor which calculates the latency period count or the trigger value. The processor executes a program stored in memory to make these calculations. A servo detector reads the position information contained in the servo bursts and provides it to the processor. A host control logic decodes commands and provides them to the processor. A servo control receives control signals from the processor and holds the actuator arm over a current track that is being read from or seeks the actuator arm to a new track. A buffer manager receives a buffer control signal from the processor that instructs the buffer manager as to how prefetch data should be read and supplied. A buffer receives and stores the prefetched data from the buffer manager and provides it to the host control logic upon request. The processor computes an access rotation amount for the target data to rotate to the head and a seek rotation amount for the actuator to move the head to the new track. A latency value is found by subtracting the seek amount from the access amount. The processor then instructs the servo control to hold the actuator on the current track and the buffer manager to prefetch during the latency period. At the end of the latency period, the servo control is instructed to seek to the new track.

In another aspect of the invention, the processor calculates a trigger value. The trigger burst or value is calculated by receiving the target's servo burst number position and finding the number of servo bursts that will rotate by the actuator as it seeks to the new track. Subtracting the number of servo bursts for the seek from the servo burst number representing the position of the target results in the trigger. The servo control is instructed to hold the head on the current track until the trigger is read by the head and the buffer manager is instructed to prefetch until the trigger is read by the head. When the servo detector receives the trigger read by the head, the servo control is instructed to seek the head to the new track.

Rotationally optimizing the seek initiation by delaying the seek until the last moment so that the actuator arm may arrive at the target track just in time to begin reading the target data enables the disc drive to prefetch and store more useful data in the buffer and efficiently provide the useful data to the host upon request.

These and various other features as well as advantages which characterize the present invention will be apparent from a reading of the following detailed description and a review of the associated drawings.

DETAILED DESCRIPTION

A disc drive contains many elements that cooperate to provide data to a host upon request. Among these elements, a control system moves an actuator which contains the read/write head. Control system embodiments of the present invention rotationally optimize the seek initiation of the actuator arm by delaying the actuator movement until the last moment so that the actuator arrives at the new track just in time to begin reading the target data. Seek optimization methods delay the actuator seek initiation by first calculating an amount of rotation or time to delay the seek initiation or by finding a seek initiation trigger. The rotational seek optimization can be applied in the case where each command is executed before the next is received or in cases where several commands are qeued and scheduled before being executed.

Figure 1:
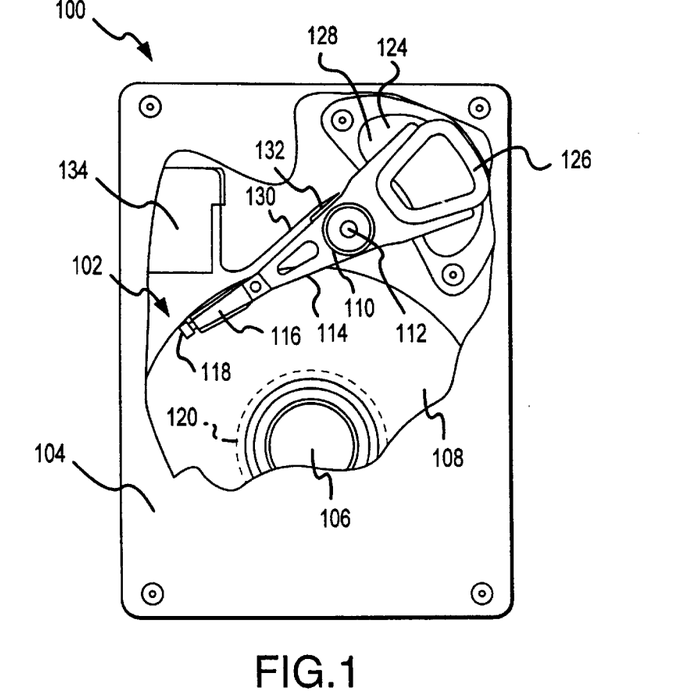
FIG. 1 is a schematic representation of a disc drive in which preferred embodiments of the invention operate.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
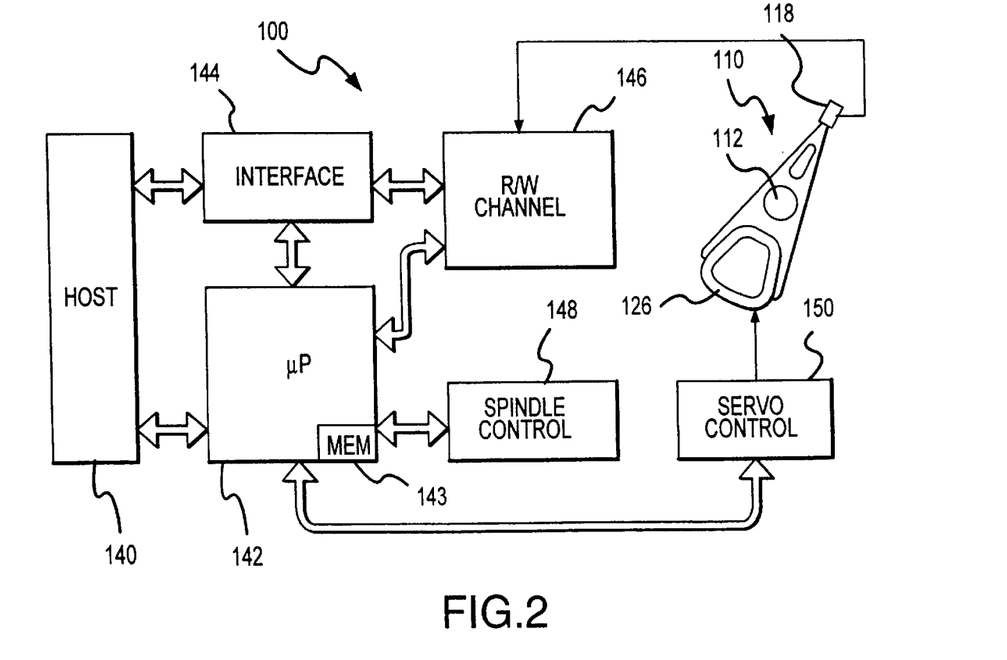
FIG. 2 illustrates a disc drive system connected to a host for the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. As will be shown in greater detail in FIG. 7, during a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. This buffer is used to store the prefetched data. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3:
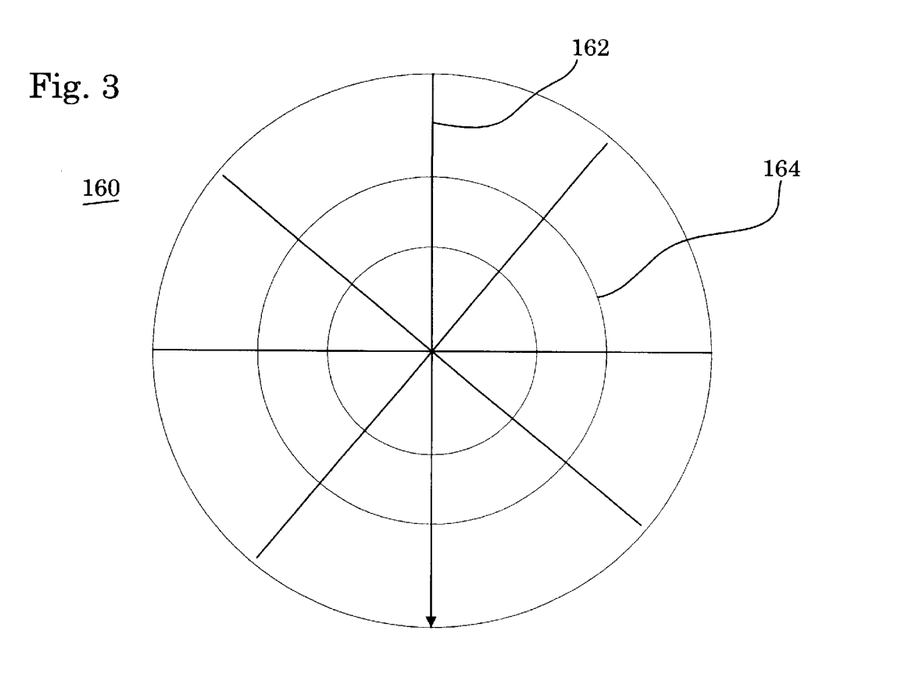
FIG. 3 illustrates a disc separated into zones by servo bursts located radially adjacent in concentric circular tracks.

FIG. 3 shows a disc 160 from a disc drive. The disc is broken up into many slices or zones by servo burst quasi-lines 162. The number of servo burst lines varies and the number shown in FIG. 3 are for example only. These servo burst lines 162 extend radially from the center of the disc 160 to the outer edge. Though these bursts 162 appear as lines, their widths increase slightly from the inner portion of the disc to the outer portion so that the burst information contained within them is read at a constant rate regardless of their distance from the center of the disc. Each burst within the burst line 162 contains vital position information used to guide the actuator. Tracks 164 form concentric circles centered about the center of the disc 160. The number of tracks also varies and the number shown in FIG. 3 are also for example only. Commands received by the disc drive from the host computer contain track information which indicates the position for the target data on the disc. A disc drive may contain several stacked discs and each disc may contain data on each side. The command may also contain information indicating the proper disc and side as well as the proper sector within the zone.

Figure 4:
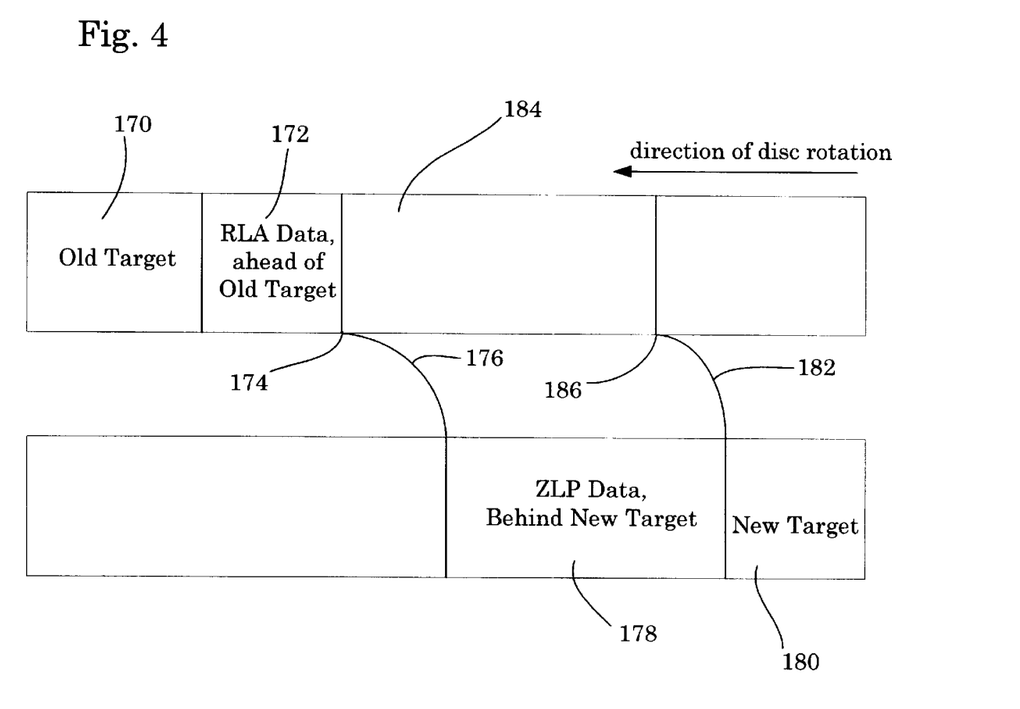
FIG. 4 illustrates a portion of two tracks in linear form where old target data and RLA data is located on one track and new target data is located on another track.

FIG. 4 illustrates both a conventional seek and a seek in accordance with the present invention shown on linear tracks for simplicity. To further explain the convention for data that is rotationally ahead of the head and data that is rotationally behind it, the disc rotation direction is indicated as moving right to left. Old target data 170 is read, and then RLA data 172 located ahead of the old target data 170 rotates by the head and is prefetched. In a conventional seek where commands are not qeued, once the new command is received the RLA ceases at that point 174, and the seek 176 initiates movement of the head to the new track where prefetching occurs for ZLP data 178 which is located rotationally behind the new target data 180. Once the new target data rotates around to the actuator, prefetching stops and the new data 180 is read. On average, one half of a rotation will occur before the new target data arrives from the time the command is received.

A seek 182 in accordance with an embodiment of the present invention is delayed until the last possible moment. When the command is received, RLA 184 continues during the latency period necessary for the disc to rotate the new target data to the head. Then, at the last possible moment at point 186, the seek 182 initiates movement of the head to the new track just as the beginning position of the new target data 180 approaches. If the head happens to arrive just before the target data arrives, the small amount of data behind the target data is prefetched.

Rather than implementing one command before receiving the next, commands may be qeued in a disc drive. In such a case, the microprocessor in the disc drive schedules the execution of the commands to minimize the seek times. For example, a first command may be to read data on an outer track, a second command may be to read data on an inner track, and a third command may be to read a command on a middle track. These commands are qeued while other disc activities are executing. When it is time to implement these commands, an inefficiency will result if they are implemented in the order received because the total seek distance will be the distance from the outer track to the inner track plus the distance from the inner track back to the middle track. To eliminate such an inefficiency, the microprocessor may schedule the commands so that the first command is implemented, then the third, and finally the second. In such a case, the total seek distance is the distance from the outer track to the middle plus the distance from the middle to the inner track. Scheduling the commands reduces the total seek distance by the distance from the inner track to the middle track.

In FIG. 4, the old target data 170 may also represent an earlier scheduled command when the disc drive is queuing the commands. In a conventional disc drive, the seek 176 then initiates immediately after the target is read rather than at point 174 or point 186 as each command is received from the queue. No RLA data is prefetched, and ZLP data 178 is loaded into the buffer until the next scheduled target data arrives. The new target 180 represents the next scheduled new target data. Embodiments of the present invention utilize a delayed seek 182 that initiates at point 186 when each command is received from the queue, rather than seeking immediately upon completing the read of the previously scheduled target. Delaying the seek permits useful RLA data to be prefetched until the last possible moment.

Figure 5:
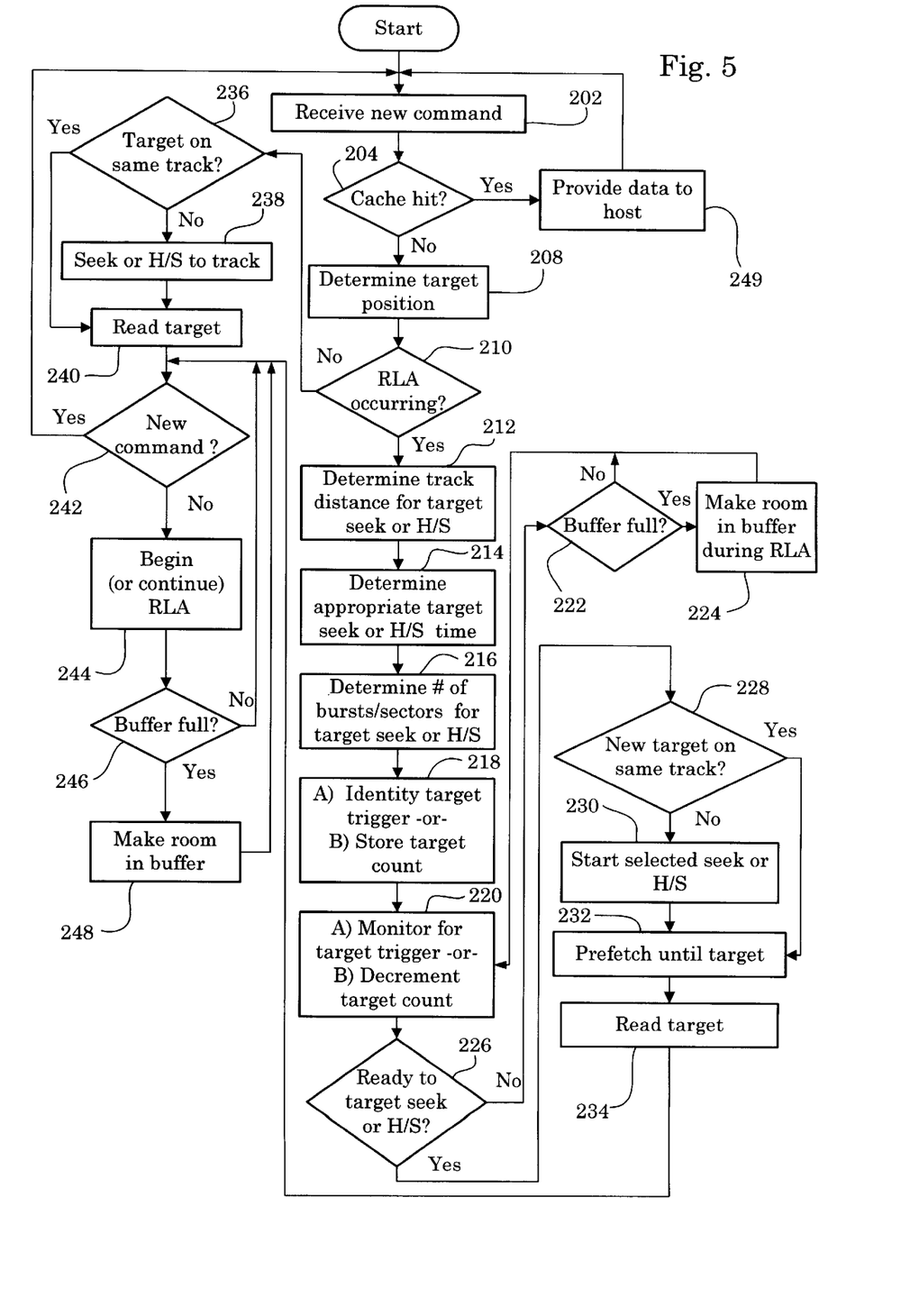
FIG. 5 is an operation flow diagram of an embodiment of the present invention operating in the disc drive system of FIG. 2, and more particularly the control system of FIG. 8.

FIG. 5 illustrates the operational flow of the control system according to one embodiment of the present invention when the commands are not being queued. New command operation 202 obtains the new instruction from the host computer. Cache hit query operation 204 tests whether the target data for the read command has already been loaded into the buffer. If it is in the buffer, then Provide data operation 206 sends that data from the buffer to the host computer. If it is not in the buffer, then Target position operation 208 obtains the track and servo burst number or sector that indicates the location of the target data. The current position of the head can then be compared with target's location to calculate an access rotation amount. The access amount is the number of servo bursts or sectors that will rotate past the head before the target data will arrive. This servo burst number can be converted to a time value by multiplying it by a known servo burst sample period.

Before using the access amount to calculate the proper RLA, RLA query operation 210 tests whether RLA was occurring before the new command was received. If not, then Track query operation 236 tests whether the target data is located on the track upon which the actuator arm is positioned. If not, Seek operation 238 moves the actuator arm to position the head over the new track. This step may involve moving the last used head to a different track on the same side of the same disc. This step may involve moving another head set up for the other side of the same disc to another track or moving a head on another disc to another track. The Seek operation 238 may also involve a head switch. A head switch occurs when the actuator arm assembly carrying the heads for all the discs only needs to be moved enough to align a head on another disc or the other side of the same disc to a track of the same radius as the radius of the track for the head last used. If the actuator arm assembly were perfectly aligned, a head switch would not require any movement. However, due to manufacturing tolerances, the actuator arm assembly is not perfectly aligned and the head switch requires actuator movement that takes some time that must be considered.

Once the seek or head switch has occurred, the Read operation 240 reads the target data once it rotates to the head. If the target was on the same track, on the same side, and on the same disc, then no seek or head switch is needed and flow moves directly from query operation 236 to Read operation 240. Once the new target has been read, New command query operation 242 tests whether a new command has been received. If not, then Begin RLA operation 244 starts prefetching the read look ahead data. If a new command is received at query operation 242, then operation flow returns to New command operation 202.

After RLA has been initiated by Begin RLA operation 244, query operation 246 tests whether the buffer is full. If so, then Erase operation 248 clears out space in the buffer for the RLA data. If not, then while RLA continues operation flow returns to query operation 242 to test whether a new command has been received. This loop continues until a new command is received.

Back at RLA query operation 210, if RLA is occurring then Track distance operation 212 finds the current track position and compares it to the new target track position to find the distance to the target data from the current actuator position. Target seek operation 214 then chooses a proper seek time for the seek. Operation 214 is one optional step and is only possible on disc drives where the actuator arm velocity profile may be varied. For disc drives where the velocity profile for a given seek is always the same, operation 214 is removed since there is no choice of seek time.

Number of bursts/sectors operation 216 calculates or looks up the seek amount, which is the number of positions, in servo bursts or sectors, that will rotate past the actuator arm as it seeks to the new track. The burst number may be converted to an actual time value by multiplying it by a known servo burst period. After the count number is computed, flow then moves to Identify/Store Operation 218.

In one embodiment, Identify/Store Operation 218 identifies a trigger position. This trigger servo burst or sector indicates when the seek should initiate so that the actuator arm will arrive at the proper track just in time to begin reading the new target data. This position trigger is identified by subtracting the seek amount from the servo burst number or sector value that indicates the position of the target data. In instances where the seek amount is greater than one disc rotation, only the fractional part of the seek amount is subtracted to find the trigger. Using sectors to track the trigger requires extra processing, but provides for a higher resolution seek which may permit more RLA data to be prefetched. In finding the trigger, Identify/Store Operation 218 may make a conservative computation so that the actuator arm arrives at the target track earlier than just in time to begin reading the target. Using a conservative computation prevents any lag in the system from causing the target to be missed, which would require a complete revolution of the disc to bring the target back to the head. Such a miss greatly reduces the efficiency of the read.

In another embodiment, Identify/Store Operation 218 calculates and stores a latency count in bursts, sectors or time. The count indicates the instant a seek should be initiated when it reaches zero. The initial count value is equal to the number of servo bursts or sectors that will rotate past the actuator arm during the seek subtracted from the access amount which is the total number of servo bursts or sectors that will rotate past the actuator arm from the old target data to the new target data. The initial count could also be implemented using actual time units. The initial count value is a latency value that the system may utilize to prefetch the RLA data. By delaying the seek until the count is decremented to zero, the RLA data is prefetched for the duration of the latency. Again, Identify/Store Operation 218 may be conservative, i.e. assumes a greater seek amount than necessary, when calculating the latency count to prevent missing the target and wasting a revolution of the disc. This is necessary because the seek amount is an estimate.

In the embodiment where a trigger is identified in Identify/Store Operation 218, Monitor/Decrement Operation 220 reads each servo burst or sector as it rotates past the head, looking for the trigger servo burst or sector value. In the embodiment where a count is stored in Identify/Store Operation 218, Monitor/Decrement Operation 220 decrements the count each time a servo burst rotates by the head.

Ready to seek query operation 226 tests in one embodiment if Operation 220 reads the trigger value or in another embodiment if Operation 220 decrements the count from one to zero. If the trigger or zero count has not occurred, Buffer query 222 tests whether the buffer is full and, if it is not, operation flow returns to Operation 220. If the buffer is full, then Erase operation 224 clears out space in the buffer and the flow moves back to Operation 220. If the trigger or zero count has occurred, flow moves to New target query operation 228 which tests whether the new target is on the track containing the old target. If so, prefetch is initiated by Prefetch operation 232. If not, Start seek operation 230 moves the actuator to the proper position and then Prefetch operation 232 begins. If Seek query operation 226 finds that the trigger burst was not yet seen or the count was not zero, then Buffer query operation 222 detects whether the buffer is full. If it is, then Erase operation 224 clears out part of the buffer to free up space and flow returns to Operation 220. If query operation 222 detects that the buffer is not full, then operation 224 is skipped and flow returns directly to Operation 220.

It is possible for the number of bursts, time, or sectors stored in Operation 218 to be zero or the trigger identified in Operation 218 to be reached at the time it is computed. In such cases, Operation 226 will immediately detect that the trigger has been read or that the burst count is zero. No RLA prefetching will occur as the seek to the new target track will initiate immediately if on a different track or the target will be read immediately if on the same track.

Once Prefetch Operation 232 begins, the prefetching continues until the target data arrives if the target data has not yet rotated to the actuator arm. A conservative trigger or count from operation 218 may cause the actuator to arrive slightly before the target data and Operation 232 utilizes the time before the target data arrives to prefetch the ZLP data. Read target operation 234 then reads the target data from the disc when the target data arrives at the head. Once this data has been read, flow moves to New command query operation 242.

Figure 6:
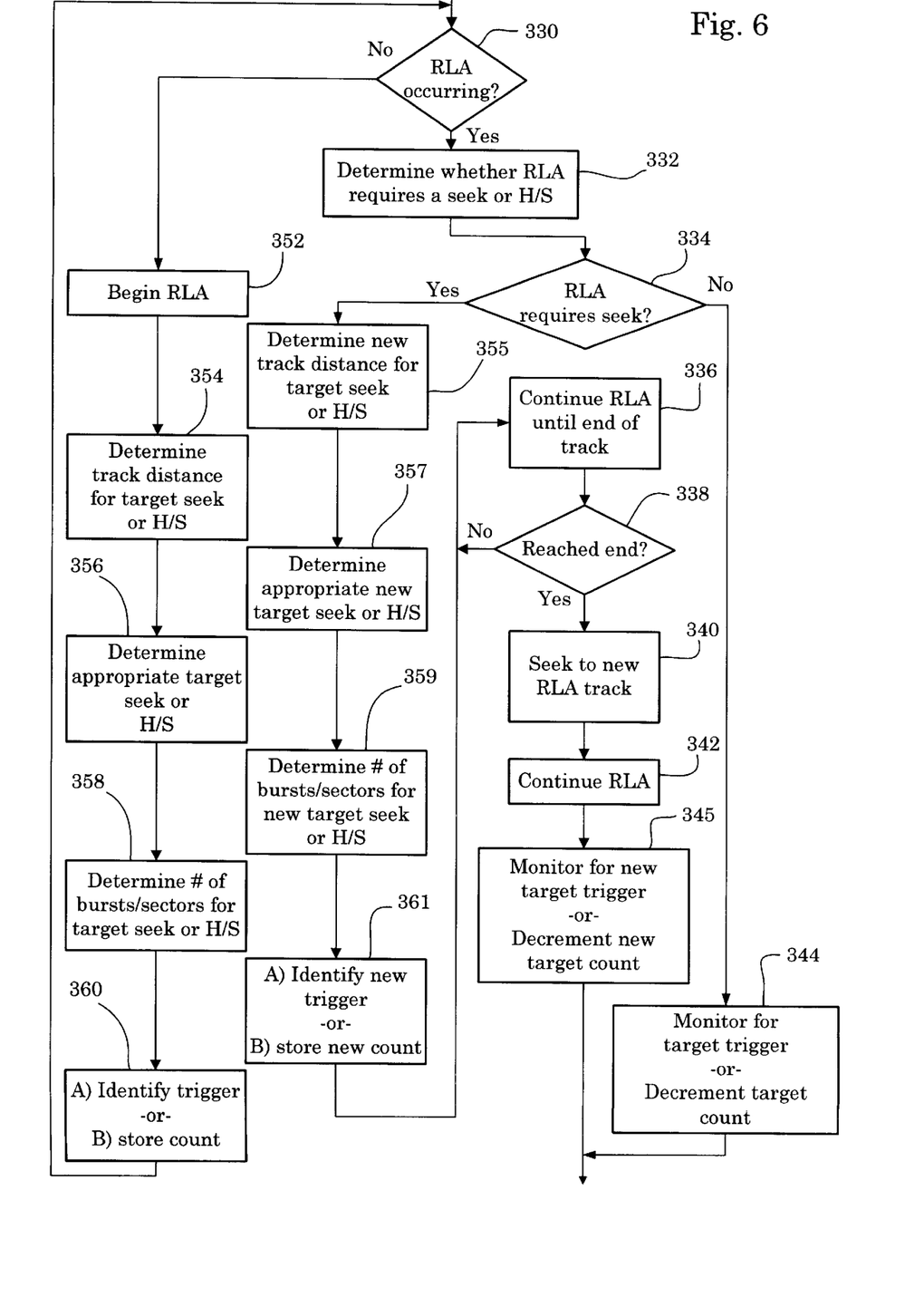
FIG. 6 is an operation flow diagram of another embodiment of the present invention operating in the disc drive system of FIG. 2, and more particularly the control system of FIG. 8.

FIG. 6 illustrates another embodiment where RLA prefetching may continue beyond the last recorded data on the current track. The embodiment of the operation flow shown in FIG. 5 can be configured to set the trigger equal to the end position of the data on the current RLA track or will set the count so that it reaches zero at the end position if the RLA will extend beyond the current track. Then the seek initiates, and ZLP data, which is located rotationally before the target, is prefetched. Rather than ending the RLA and prefetching the ZLP data before the target, the operation may permit RLA to continue on sequential data on a new RLA continuation track or head. When data is being written, as the head reaches the end of a track, it must seek to the new track before continuing to write the data. The seek requires time and the disc rotates an amount before the head arrives at the new track and begins writing again. That seek, and the corresponding amount of rotation, is the same amount that is required when the head is reading RLA data, reaches the end, and then must seek to the RLA continuation track. Therefore, the seek triggered by the end position of the RLA track results in the head arriving at the continuation RLA track just as the beginning portion of data on that track arrives at the head.

In such a case where the RLA is to continue beyond the end of the RLA track, the operation flow of FIG. 6 may be substituted into the operation flow of FIG. 5 and flow moves to query operation 330 of FIG. 6 instead of query operation 210 of FIG. 5.

Query operation 330 tests whether RLA is occurring once the new command is received. If RLA has not begun, flow moves to Begin RLA operation 352 and prefetching starts. Once prefetching begins, the trigger or count must be calculated for the target seek. Calculate track distance operation 354 finds the current track position and compares it to the new target track position. The new target position has already been found before query operation 330, as in operation 208 of FIG. 5.

Target seek operation 356 chooses a proper seek time for the target seek. Bursts/sectors operation 358 calculates or looks up the seek amount. Identify/Store Operation 360 then identifies a target trigger in one embodiment or a target count in another. Flow then returns to query operation 330 which will then detect that RLA is occurring. Flow is then directed to RLA seek operation 332 which compares the current position to the trigger or count to detect whether the RLA will reach the last data recorded on the current track before the trigger or zero count occurs indicating a switch to another track is needed to continue RLA before the target seek must initiate.

RLA seek query operation 334 then decides whether to begin monitoring for the target trigger or count based upon whether the RLA continuation requires a seek. If RLA continuation does not require a seek, then flow moves to Monitor/Decrement operation 344 which begins looking for the target trigger or begins decrementing the burst/sector count each time a burst or sector rotates by the actuator. Operation 344 performs as operation 220 of FIG. 5, and the remaining operations of FIG. 5 continue.

If the RLA continuation requires a seek, then query operation 334 directs flow to Track distance operation 355. Operation 355 computes the distance from the continuation RLA track to the target track. Then Target seek operation 357 chooses a proper seek time for the target seek. Bursts/sectors operation 359 calculates or looks up the seek amount for the seek from the continuation RLA track to the target track. Identify/Store operation 361 identifies a new target trigger in one embodiment from the target position and the new seek amount from the RLA continuation track. In another embodiment, Operation 361 stores a new target count obtained from a new access amount and the new seek amount. The new access amount is computed from the target's position and the start data position of the RLA continuation track. Last data operation 336 then computes when to initiate the RLA continuation seek by looking for the last piece of data recorded on the current track and then seeking once that data has been prefetched. End query operation 338 tests whether the end piece of data for the current track has been read. If it has not, flow moves back to operation 336 which continues to look for the last piece of data. If the last piece has been read, then Seek operation 340 moves the actuator to the RLA continuation track.

Continue operation 342 continues the RLA at the continuation track, and operation flow continues to Monitor/Decrement operation 345 which detects when the new target trigger has rotated to the actuator arm or the new target count has reached zero. The target count is not decremented until the head is positioned on the RLA continuation track. Operation 345 performs as operation 220 of FIG. 5, and the remaining operations of FIG. 5 continue.

Figure 7:
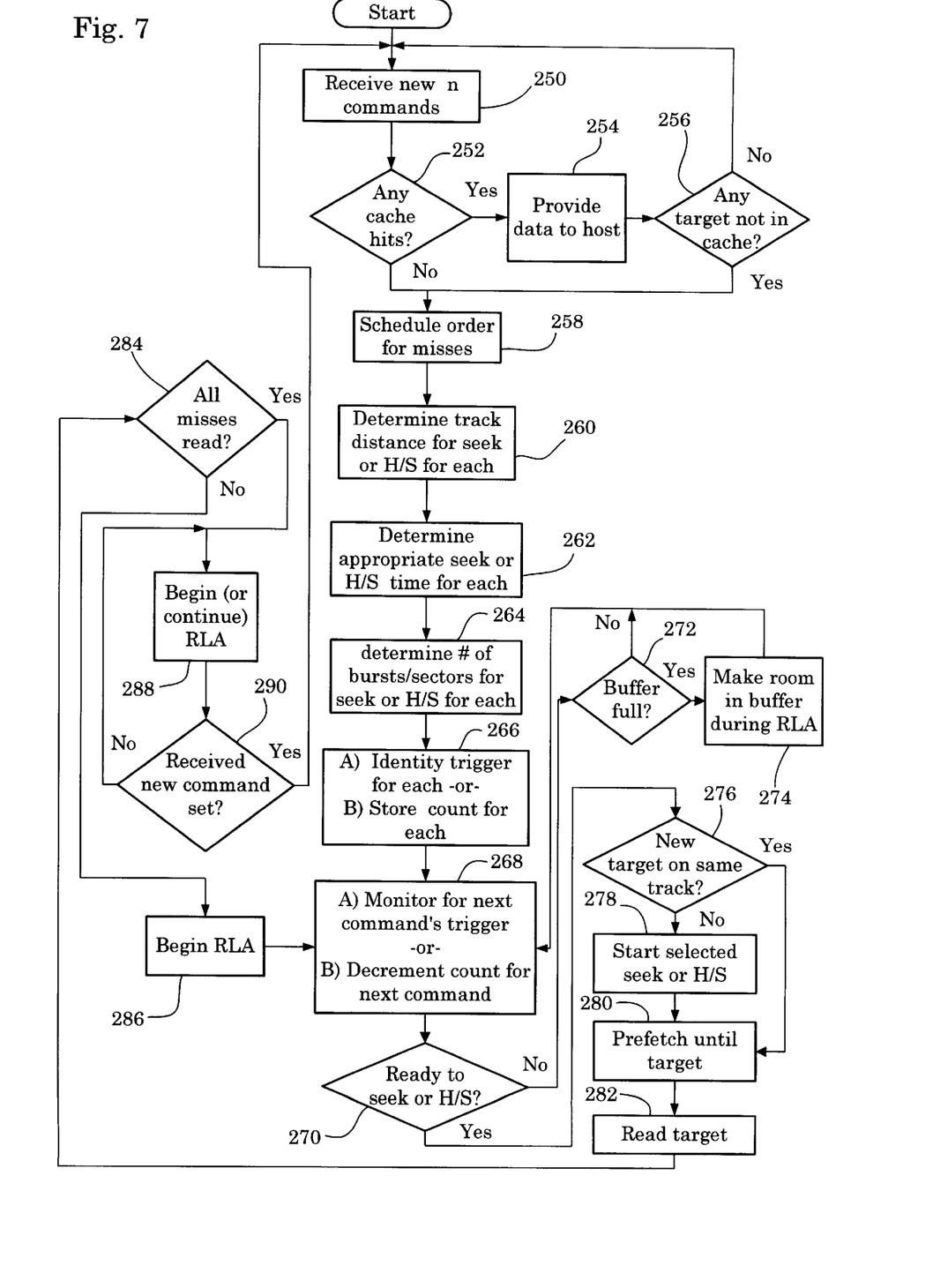
FIG. 7 is an operation flow diagram of another embodiment of the present invention operating in the disc drive system of FIG. 2, and more particularly the control system of FIG. 8.

FIG. 7 illustrates the operational flow of the control system according to another embodiment of the invention. This embodiment corresponds to operations when commands are qeued and then scheduled by the disc drive's microprocessor. New commands operation 250 obtains the new set of commands from the host computer and qeues them. Cache hit query operation 252 detects whether the target data for the set of read commands has already been loaded into the buffer. If it is in the buffer, then Provide data operation 254 sends that data from the buffer to the host computer. Target query 256 detects whether any targets were not in the cache. If all of the target data was in the cache, then operation flow returns to Receive operation 250. If some of the target data was not a cache hit, the flow moves to Schedule operation 258. If query operation 252 detects that none of the target data was in cache, then flow would have moved directly to Schedule operation 258. Schedule operation 258 reorders the commands so that access amounts are minimized. As a part of the Schedule operation 258, the position for each new target is found as well as the access amount that occurs between each new target data. The access amount can be expressed in servo bursts, or time.

Distance operation 260 computes the distance the actuator arm must seek for each scheduled command. The actuator must seek from the track containing an earlier scheduled target data to the track containing the next scheduled target data. Once the seek distance for each is calculated, then Time operation 262 obtains the proper time for each seek. Operation 262 is one optional step and is implemented only in disc drives that have a variable velocity profile for a given seek. Operation 262 is not included in disc drives with a single seek time for each seek.

Bursts/sectors operation 264 calculates or looks up the seek amount, which is the number of positions in servo bursts that will rotate past the head as it seeks for each scheduled command. This seek amount may be expressed in servo bursts or time. Flow then moves to Identify/Store Operation 266.

In one embodiment, Identify/Store Operation 266 identifies a trigger for each scheduled target data command. This trigger is identified by subtracting the number of servo bursts or position indicators that will rotate by the actuator arm during the seek from the servo burst number or position value that indicates the position of the next scheduled target data. The trigger indicates when the seek should initiate so that the actuator arm will arrive at the proper track just in time to begin reading the next scheduled target data. The trigger may be calculated similarly in terms of sectors rather than bursts.

In another embodiment, Identify/Store Operation 266 computes and stores a count representative of the latency period. The count indicates the instant a seek should be initiated when it reaches zero. The initial count is equal to the number of servo bursts or sectors that will rotate by the actuator arm during the seek subtracted from the access amount which is the total number of servo bursts or sectors that will rotate by the actuator arm from the earlier scheduled target data to the new or next scheduled target data. The initial count for each command corresponds to the latency period that the system may utilize to prefetch the RLA data. The latency value can be expressed in servo bursts or time as well as sectors since the number of sectors per track is constant where the RLA will occur. Delaying the seek until the count equals zero permits RLA data to be prefetched for the duration of the latency.

In the embodiment where a trigger is identified in Operation 266, Monitor/Decrement Operation 268 monitors each servo burst or sector as it rotates by the actuator arm, looking for the trigger. In the embodiment where a count is stored in Operation 266, Monitor/Decrement Operation 268 decrements the count each time a servo burst or sector rotates by the actuator arm. Seek query operation 270 tests in one embodiment whether Operation 268 sees the trigger or in another embodiment if Operation 268 decrements the count to zero. If the trigger or zero count has not occurred, Buffer query 272 detects whether the buffer is full, and if it is not flow moves back to Monitor/Decrement Operation 268. If the buffer is full, then Erase operation 274 clears out space in the buffer and the flow moves back to Operation 268. If the trigger or zero count has occurred, flow moves to New target query 276 which detects whether the next scheduled target data is on the same track as the earlier scheduled target data. If so, prefetch is initiated by Prefetch operation 280. If not, Start seek operation 278 moves the actuator arm to the proper position and then Prefetch operation 280 begins. Prefetch continues until the target data has reached the actuator arm at which time Read target operation 282 begins reading the next scheduled target data.

After all the target data has been read, Cache miss query operation 284 detects whether all the scheduled target data has been read. If it has not, then Begin RLA operation 286 starts prefetching RLA data and flow moves back to Operation 268 which continues to look for the next trigger or decrement the count. If all scheduled target data has been read, then Begin RLA operation 288 starts prefetching RLA data and New command query 290 detects whether a new command set is received. If a new set has not been received, then RLA operation 288 continues the prefetch. This loop continues until a new command set is received. Once a new command set is received, flow returns to New commands operation 250.

Figure 8:
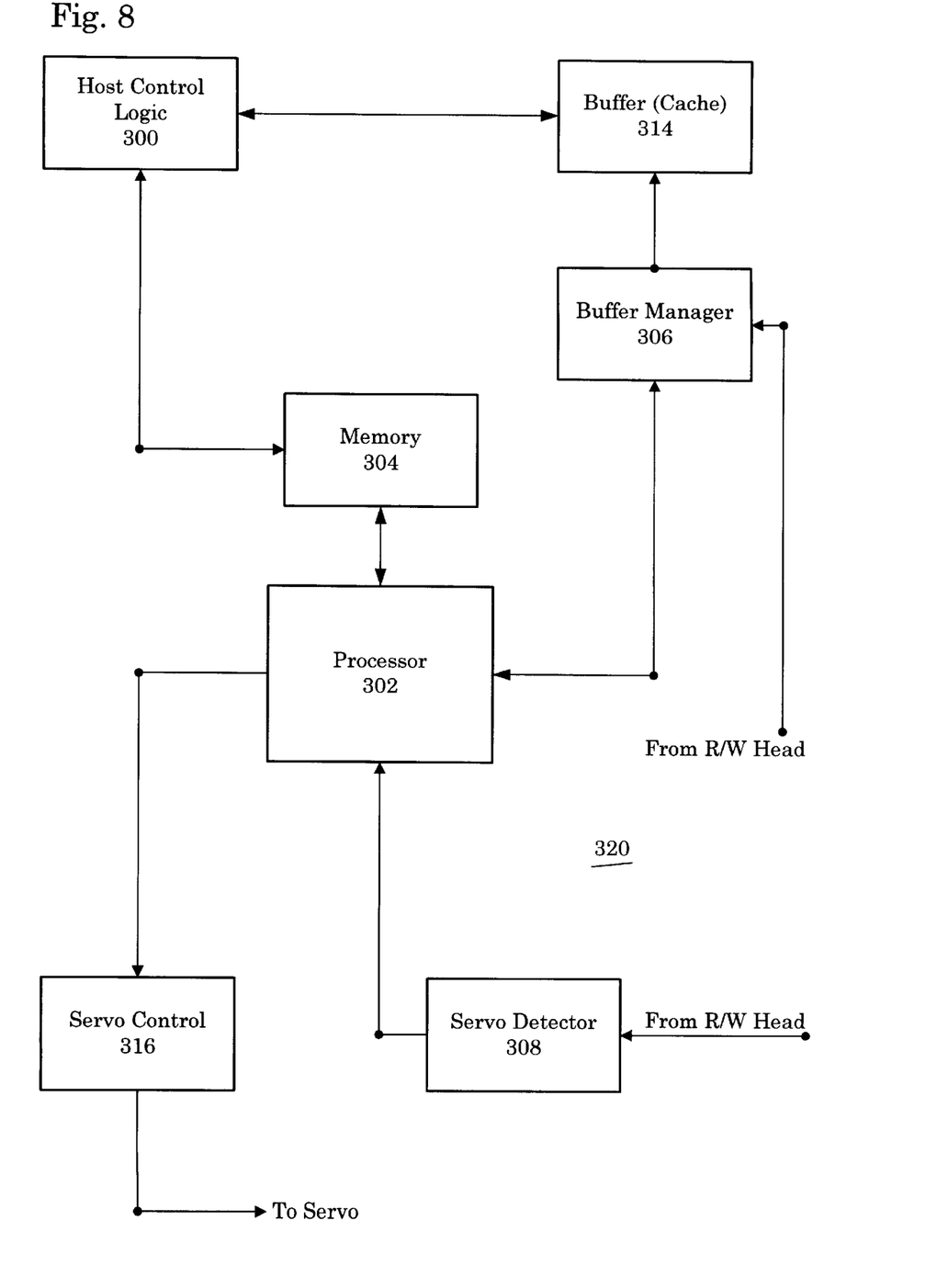
FIG. 8 illustrates a control system in accordance with the present invention.

FIG. 8 illustrates a control system 320 in an embodiment of the present invention. The system includes a host control logic 300, a processor 302, a memory 304, a buffer manager 306, a buffer 314, a servo control 316, and a servo detector 306. An instruction is received from the host computer by the host control logic 300. The host control logic 300 is located within the interface 144 shown in FIG. 2. The host control logic 300 decodes the command from the instruction received by the host. The host control logic 300 also accesses prefetched data from the buffer 314.

The buffer 314 receives prefetched data from the buffer manager 306 and stores the prefetched data until it is requested by the host control logic 300. The buffer 314 is described as a part of the interface 144 of FIG. 2.

The memory 304 stores the programming code that the processor implements when calculating when to initiate the seek so that it arrives just in time to read the target data. The memory also contains look-up tables for the seek distances and corresponding seek amounts either in servo bursts, sectors, or time. The memory 304 is shown as MEM 143 and as a part of the microprocessor 142 of FIG. 2.

The servo control 316 is operably connected to the processor. The servo control 316 responds to a control signal from the processor and drives the servo to position the actuator arm appropriately.

The buffer manager 306 receives prefetched data from the read/write head located on the actuator arm. The buffer manager 306 also receives a buffer control signal from the processor that instructs the buffer manager as to how the prefetched data is to be provided to the buffer 314. The buffer manager 306 may be included in the R/W channel 146 of FIG. 2. An additional function of the buffer manager 306 may be to detect sector positions on the disc and provide the sector position to the processor.

A servo detector 308 receives position information that is read by the head on the actuator arm as it passes over servo bursts. This position information includes the current position of the actuator arm. In one embodiment, the servo detector reads and supplies the signal to the processor which is analyzed for the trigger burst. In another, the servo detector reads and supplies the signal to the processor which is used to decrement the burst count. The position signal may include sector information or servo burst information. The servo detector 308 may also included in the R/W channel 146 of FIG. 2.

The processor 302, shown as microprocessor 142 in FIG. 2, implements programming stored in the memory 304. In operation, the processor 302 requests and receives the command information from the host control logic 300. The actuator arm's burst or sector position information is also received by the processor from the servo detector 308.

In one embodiment, based on the command received from the host control logic 300 and the position information, the processor calculates an access amount and a seek amount. The processor may obtain a seek amount by cross referencing in the table stored in memory the current track position of the actuator arm with the track position indicated by the command. The processor may instead compare the current and target track positions to find the distance and then scan a table in memory to look up a seek amount corresponding to the seek distance. The rotation and seek amounts can be in servo bursts, sectors, or time.

From the access amount and the seek amount, the latency can be computed. In one embodiment, the latency period is found by subtracting the seek amount from the access amount. Once the latency is found, the processor instructs the buffer manager 306 to continue RLA prefetching until the latency is over and provides a control signal to the servo control 316 to hold the actuator on the current track for the duration of the latency. The processor 302 detects when the latency is over by receiving the position signal from the servo detector 308 and looking for a trigger burst or sector. In one embodiment, the processor 308 could receive the sector position signal from the buffer manager 306 rather than the servo detector 308. The processor 302 calculates the trigger by subtracting the number of bursts or sectors required for the seek from the burst number or sector contained in the command. When the trigger is received, the processor 302 provides the control signal to the servo control 316 which causes the actuator arm to be repositioned to the new target data track. The processor 302 also instructs the buffer manager 306 to stop directing data to the buffer 314 once the target data has arrived at the R/W head.

In another embodiment, the processor 302 receives the actuator burst position signal from the servo detector 308 or a sector position signal from either the buffer manager 306 or the servo detector 308 and analyzes the signal for the trigger or position. In one embodiment, the trigger is calculated by the processor 302 by subtracting the number of bursts or sectors needed for a seek from the burst number or sector of the target data's position. The number of servo bursts or sectors that will rotate by the actuator arm during the seek from the current track to the target track is either calculated by the processor 308 or is retrieved from memory 304. This number of bursts or sectors is then subtracted from the burst number or sector contained in the command and the result is the trigger position.

Once the servo detector 308 reads the trigger servo burst number and signals the processor 302 or the buffer manager 306 or servo detector 308 reads the trigger sector and signals the processor 302, processor 302 sends the proper control signal to the servo control 316 to initiate the seek to the new target data's track. The actuator arm will arrive just in time to begin reading the new target data.

To summarize exemplary embodiments of the present invention, a method for loading a buffer with data read from a disc drive can be realized by executing the following steps. A command is received as in operation 202 and then an access amount, in servo bursts, sectors or time, is calculated from the target's position as in operation 208. A seek amount in servo bursts, sectors, or time is found as in operation 214. The seek amount can be obtained by first finding the distance to the new track as in operation 212. For drives with variable seek times, the appropriate seek time may be found first as in operation 214. A latency, in servo bursts, sectors, or time, may then be computed from the seek amount and the access amount. The latency may be calculated by subtracting the seek amount from the access amount, as in operation 218. The data located ahead of the target data continues to be read, as in operation 220 for a duration equal to the latency. Then the seek is initiated from the current track to the desired track as in operation 230.

Another method for loading a buffer involves executing the following steps. Receive a command as in operation 202. Then calculate a number of servo bursts or sectors that will rotate beyond an actuator arm during a seek, as in operation 216. If the disc drive is capable of varying the velocity profile, then a proper velocity profile is chosen as in operation 214 and the number of servo bursts or sectors that rotate by during the seek is calculated based upon the chosen profile. A servo burst number or sector that triggers the seek is then found as in operation 218. The trigger may be found by subtracting the number of bursts or sectors that will rotate beyond the actuator during the seek from the burst number or sector that indicates the position of the target data and is included in the command. Data located ahead of the old target data is then read until the trigger has rotated to the actuator arm, as in operation 220. When the trigger has rotated to the actuator arm, the seek initiates and the actuator arm moves from the current track to the desired track as in operation 230.

The method for loading the buffer with data may also be applied to instances where the commands are qeued and scheduled. The method may be realized by executing the following steps. A set of commands is received as in operation 250. The commands are scheduled to minimize the seek times as in operation 258. An access amount for each command is computed in operation 258 as the commands are being scheduled. A seek amount is found for each command as in operation 264. Where multiple seek times for a seek are available, a seek time may be chosen, as in operation 262, and then the seek amount is found based upon the chosen seek time. A latency is calculated for each command as in operation 266 and data located ahead of an earlier scheduled command is read, as in operation 268, for a duration equal to the latency. Then, for each command, the seek of the actuator to the track of the next scheduled command is initiated as in operation 278.

Another method for loading data into the buffer when commands are being qeued may be realized by executing the following steps. A set of commands is received as in operation 250. The commands are scheduled to minimize the seek times as in operation 258. For each target data corresponding to a command, a number of servo bursts or sectors that will rotate beyond an actuator arm during a seek to from the earlier scheduled target data's track is found as in operation 264. For each target data corresponding to a command, a servo burst number or sector that triggers the seek is found as in operation 266 from the number of bursts or sectors that will rotate by during the seek and from the next scheduled target data's position indicated by a servo burst number or sector. The data located ahead of the earlier scheduled target data is then read and stored in the buffer until the seek trigger rotates to the actuator arm, as in operation 268. Then the seek initiates and the actuator arm moves to the track containing the next scheduled target data, as in operation 278.

In one control system such as 320, a processor 302 signals a servo control 316 to position the actuator during the loading of prefetch data into the buffer. The processor receives read/write commands as in operation 202 from the host control logic 300. The host control logic 300 receives instructions from the host computer and decodes them for the processor 302. For each command the processor 302 receives, a latency is computed from the actuator's current position, provided by the servo detector 316 or buffer manager 306, and the starting position of the target data indicated by the command. The latency may be calculated by the processor 302 by calculating an access amount as in operation 208 and a seek amount as in operation 216, in servo bursts, sectors, or time. The seek amount may be found by cross-referencing the current position and target's position in the memory to find the seek amount. Then the seek amount is subtracted from the access amount to yield the latency as in operation 218. The processor 302 instructs the servo control 316 to the hold the actuator arm on the current track during the latency. The processor 302 also instructs the buffer manager 306 to prefetch the data and send it to the buffer 314 during this latency. At the end of the latency, the processor 302 instructs the servo control 316 to reposition the actuator on the track containing the new target data as in operation 230. The processor 302 executes a program contained in the memory 300 to perform these functions.

In another control system such as 320, a processor 302 signals a servo control 316 to position the actuator during the loading of prefetch data into the buffer. The processor 302 receives read/write commands from the host control logic as in operation 202. The host control logic 300 receives instructions from the host computer and decodes them for the processor 302. For each command the processor 302 receives, a seek trigger is obtained from the actuator's current position, provided by the servo detector 316 or buffer manager 306, and the starting position of the target data indicated by the command. The seek trigger may be calculated by the processor 302 by finding a number of servo bursts or sectors on the disc that will rotate by the actuator arm during a seek of the actuator arm from the current track to the desired track as in operation 216. This number may be found by cross-referencing in memory 304 the current track position with the desired track position of the target data. Then the number of servo bursts or sectors that will rotate by the actuator arm during the seek is subtracted from the servo burst number or sector indicating the target's position to yield the trigger burst as in operation 218. The processor 302 instructs the servo control 316 to hold the actuator arm on the current track until the seek trigger is reached. The processor 302 also instructs the buffer manager 306 to prefetch the data and send it to the buffer 314 until the trigger is reached. Once the trigger is reached, the processor 302 instructs the servo control 316 to reposition the actuator on the track containing the new target data as in operation 230. The processor 302 executes a program contained in the memory 304 to perform these functions.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for loading a buffer with data read from a disc drive by rotationally optimizing seek initiation, comprising steps of:
   a) receiving a read/write command for new target data stored on a disc;
   b) calculating an access amount for the new target data to rotate from a current new target data position to a head;
   c) obtaining a seek amount for transporting the head positioned on a current track on the disc to a desired track on the disc containing the new target data;
   d) computing a latency from the seek amount and the access amount;
   e) reading data located ahead of a previous target data on the current track for a duration equal to the latency; and
   f) seeking an actuator assembly containing the head from the current track to the desired track at the end of the latency.

2. The method of claim 1 wherein the access amount, the seek amount, the latency, and the duration are amounts of time, and wherein the amount of time equal to the latency is decremented while the data located ahead of a previous target data is read and the end of the latency occurs when the amount of time equals zero.

3. The method of claim 1 wherein the access amount, the seek amount, the latency, and the duration are numbers of servo bursts, and wherein the number of servo bursts equal to the latency is decremented while the data located ahead of a previous target data is read and the end of the latency occurs when the number of servo bursts equals zero.

4. The method of claim 1 wherein the latency and the duration are numbers of sectors, and wherein the number of sectors equal to the latency is decremented while the data located ahead of a previous target data is read and the end of the latency occurs when the number of sectors equals zero.

5. The method of claim 1 wherein step d) comprises subtracting the seek amount from the access amount.

6. The method of claim 1 wherein a seek refers to moving the head located on the actuator assembly from one track to another.

7. The method of claim 1 wherein a seek refers to selecting a head on the actuator assembly that is different than the head previously selected.

8. The method of claim 1, wherein the end of the latency is identified by a trigger position and wherein the trigger position is computed by finding a number of positions that will rotate beyond a head during a seek of the head from the current track containing old target data to the desired track containing the new target data; and calculating the trigger position from the position of the new target data and the number of positions that will rotate beyond the head during the seek.

9. The method of claim 8 wherein calculating the trigger position comprises subtracting the number of positions that will rotate beyond the head during the seek from the position of the new target data included in the command.

10. The method of claim 8 wherein the position of the new target data, number of positions, and trigger position are servo burst values.

11. The method of claim 8 wherein the position of the new target data, number of positions, and trigger position are sector values.

12. The method of claim 1, wherein the command received is one of a plurality of commands in a set, wherein step a) further comprises receiving other commands in the set for other new target data;

wherein step b) further comprises b)(i) scheduling the command and the other commands in the set to minimize the access amounts; and b)(ii) as part of scheduling, calculating, for each scheduled command that follows a previous scheduled command, an access amount for a next new target data to rotate from the previous scheduled new target data position to the head;

wherein step c) further comprises obtaining, for each scheduled command following a previous scheduled command, a seek amount for transporting the head from a track containing the previous scheduled new target data to a desired track containing the next scheduled new target data;

wherein step d) further comprises computing, for each scheduled command that follows a previous scheduled command, a latency for each new target data from the seek amount obtained for each new target data and the access amount calculated for each new target data;

wherein step e) further comprises reading, for each scheduled command that follows a previous scheduled command, data located ahead of the previous scheduled new target data for a duration equal to the latency computed for the next scheduled new target data; and wherein step f) further comprises seeking, for each scheduled command that follows a previous scheduled command, an actuator assembly containing the head from a track containing the previous scheduled new target data to the desired track containing the next scheduled new target data at the end of the latency.

13. The method of claim 1 wherein step c) comprises choosing a seek velocity profile and obtaining the seek amount from the velocity profile.

14. The method of claim 1, wherein the data on the current track continues at a beginning position of a continuation track, the method further comprising g) detecting whether an end of the current track will rotate to the head before the end of the latency occurs;

h) calculating a new access amount for the new target data to rotate to the head from the new target data's position when the beginning position of the continuation track is positioned at the head;

i) obtaining a new seek amount for transporting the head from the continuation track to the desired track;

j) computing a new latency from the new seek amount and the new access amount;

k) reading data located ahead of a previous target data on the current track until an end of the current track is reached;

l) seeking the actuator assembly to the beginning of the continuation track;

m) reading data located on the continuation track for a duration equal to the new latency; and n) seeking the actuator assembly from the continuation track to the desired track at the end of the new latency.

15. A control system for optimizing the acquisition of read look ahead data by rotationally optimizing the seek initiation for a head in a disc drive interfaced with a host computer, comprising:

a processor receiving read/write commands and head position information, calculating a latency from the head position information and a read/write command, providing an actuator control signal to hold the head on a track containing old target data while read look ahead occurs during the latency, providing an actuator control signal to seek the head to a new track corresponding to the read/write command when the latency ends, and providing a buffer control signal;

host control logic receiving instructions from the host computer, decoding the read/write commands from the instructions, providing the read/write commands to the processor, and upon request by the host computer accessing previously prefetched data that includes data from read look ahead;

a servo control receiving the actuator control signal, and positioning the head according to the actuator control signal;

a buffer receiving and storing prefetched data and providing data from the buffer to the host control logic upon request for the data;

a buffer manager receiving prefetched data from the head, receiving the buffer control signal from the processor, and loading data to the buffer in accordance with the buffer control signal;

a memory storing code that the processor references to calculate the latency; and a servo detector receiving position information read by the head from the disc and providing the position information to the processor.

16. The control system of claim 15 wherein the processor calculates the latency by computing an access amount from a current position read by the head with a new target data position contained in the read/write command and by obtaining a seek amount from a current track position read by the head and a new target data track position contained in the read/write command.

17. The control system of claim 16 wherein the processor calculates the latency by subtracting the seek amount from the access amount.

18. A control system for optimizing the acquisition of read look ahead data by rotationally optimizing the seek initiation for a head in a disc drive interfaced with a host computer, comprising:

a servomechanism that can seek the head; and means for scheduling a control signal that initiates the seek of the head from a current track to a desired track containing target data so that read look ahead continues on the current track until a last instance before a seek must occur to position the head at the desired track just before the target data arrives.

* * * * *

UNITED STATES PATENT AND TRADEMARK OFFICE
CERTIFICATE OF CORRECTION

PATENT NO.    : 6,339,811 B1
DATED         : January 15, 2002
INVENTOR(S)   : Gaertner et al.

It is certified that error appears in the above-identified patent and that said Letters Patent is hereby corrected as shown below:

<u>Title page,</u>
Item [73], Assignee, delete "Seagate Technologh LLC" and insert therefore -- Seagate Technology LLC --.

Signed and Sealed this

Eighth Day of April, 2003

JAMES E. ROGAN
*Director of the United States Patent and Trademark Office*